United States Patent [19]

Schiel

[11] Patent Number: 5,286,245
[45] Date of Patent: Feb. 15, 1994

[54] FLEXURE-COMPENSATED ROLL

[75] Inventor: Christian Schiel, Heidenheim, Fed. Rep. of Germany

[73] Assignee: J.M. Voith GmbH, Fed. Rep. of Germany

[21] Appl. No.: 950,647

[22] Filed: Sep. 23, 1992

[30] Foreign Application Priority Data

Oct. 10, 1991 [DE] Fed. Rep. of Germany ....... 4133562

[51] Int. Cl.$^5$ .......................... B30B 3/04; B21B 13/02
[52] U.S. Cl. .......................................... 492/7; 492/10; 492/20
[58] Field of Search ....................... 492/5, 6, 7, 10, 20

[56] References Cited

U.S. PATENT DOCUMENTS

| | | | |
|---|---|---|---|
| 3,846,883 | 11/1974 | Biondetti | 492/7 |
| 3,932,921 | 1/1976 | Biondetti | 492/7 |
| 4,064,607 | 12/1977 | Wolf . | |
| 4,328,744 | 5/1982 | Pay et al. . | |
| 4,372,238 | 2/1983 | Güttinger | 492/7 |
| 4,757,585 | 7/1988 | Niskanen | 492/7 |
| 4,776,069 | 10/1988 | Snellman | 492/7 X |
| 4,815,183 | 3/1989 | Biondetti | 492/7 |
| 4,856,157 | 8/1989 | Küsters | 492/7 |
| 4,996,862 | 3/1991 | Schrörs | 492/7 X |
| 5,033,176 | 7/1991 | Schiel | 492/7 |
| 5,045,183 | 9/1991 | Schweiss et al. . | |
| 5,060,357 | 10/1991 | Roerig et al. | 492/5 X |

FOREIGN PATENT DOCUMENTS 3001487 8/1980 Fed. Rep. of Germany .......... 492/7

Primary Examiner—Timothy V. Eley
Attorney, Agent, or Firm—Ostrolenk, Faber, Gerb & Soffen

[57] ABSTRACT

A flexure compensated roll comprising a rotatable roll shell around a longitudinally extending support therethrough. A longitudinally extending press shoe supported on the support. A piston movably supported on the support above a sealed pressure space. The piston has a saddle toward the interior of the roll casing. The shoe has a middle pressure chamber fluid connected with the pressure space of the piston. The shoe also has rows of hydrostatic pockets on both circumferential sides of the middle chamber. These are supplied by narrowed choke passages with hydraulic fluid. The supply of hydraulic fluid to the hydrostatic pockets bypasses the piston pressure space and/or the middle chamber and is from a pressure source to the hydrostatic pockets without pressure regulation. A regulating valve controls the force between the longitudinal support and the casing of the roll by setting the pressure in the middle chamber and by setting the pressure in the piston pressure space. Details of the particular pressure regulation valve are also disclosed. The saddle at the top of the piston is swivelable about a swivel joint to adapt to the interior of the roll casing as it flexes. The hydraulically effective pressing area of the shoe is larger than the hydraulically effective area of the piston in the pressure space. A spring and/or an initial pressurization region in the pressure space initially raises the piston and shoe toward the interior of the roll casing.

21 Claims, 3 Drawing Sheets

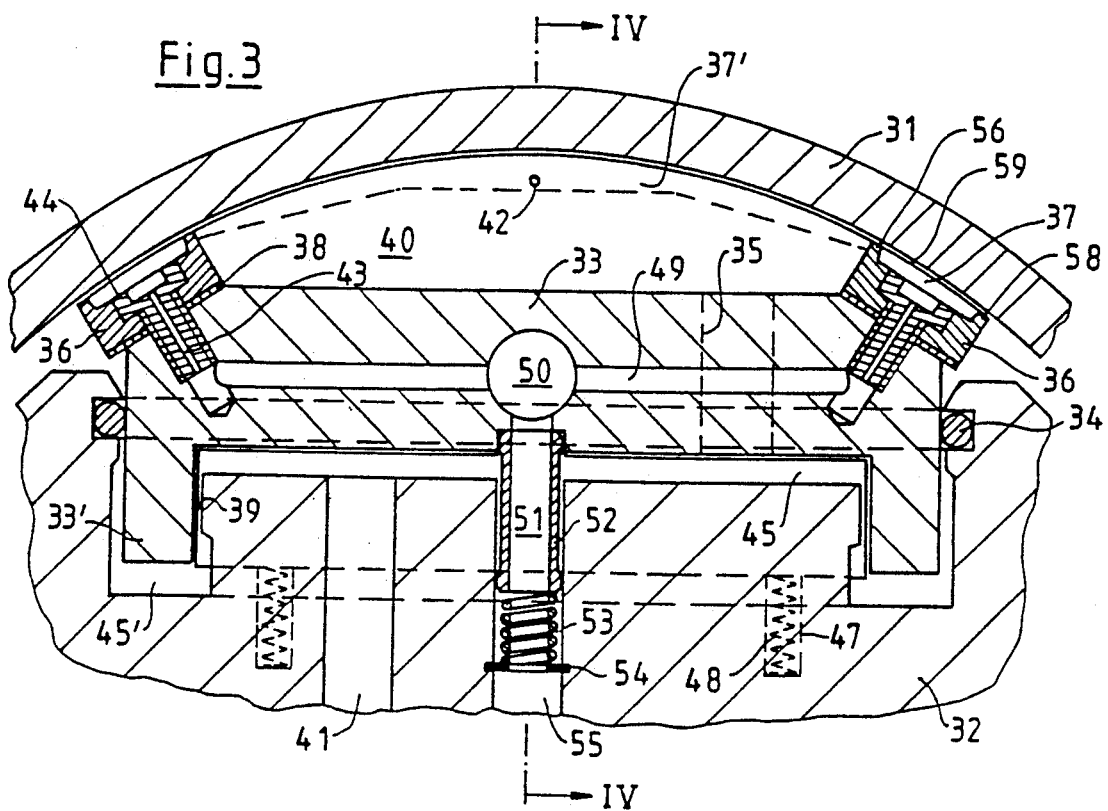
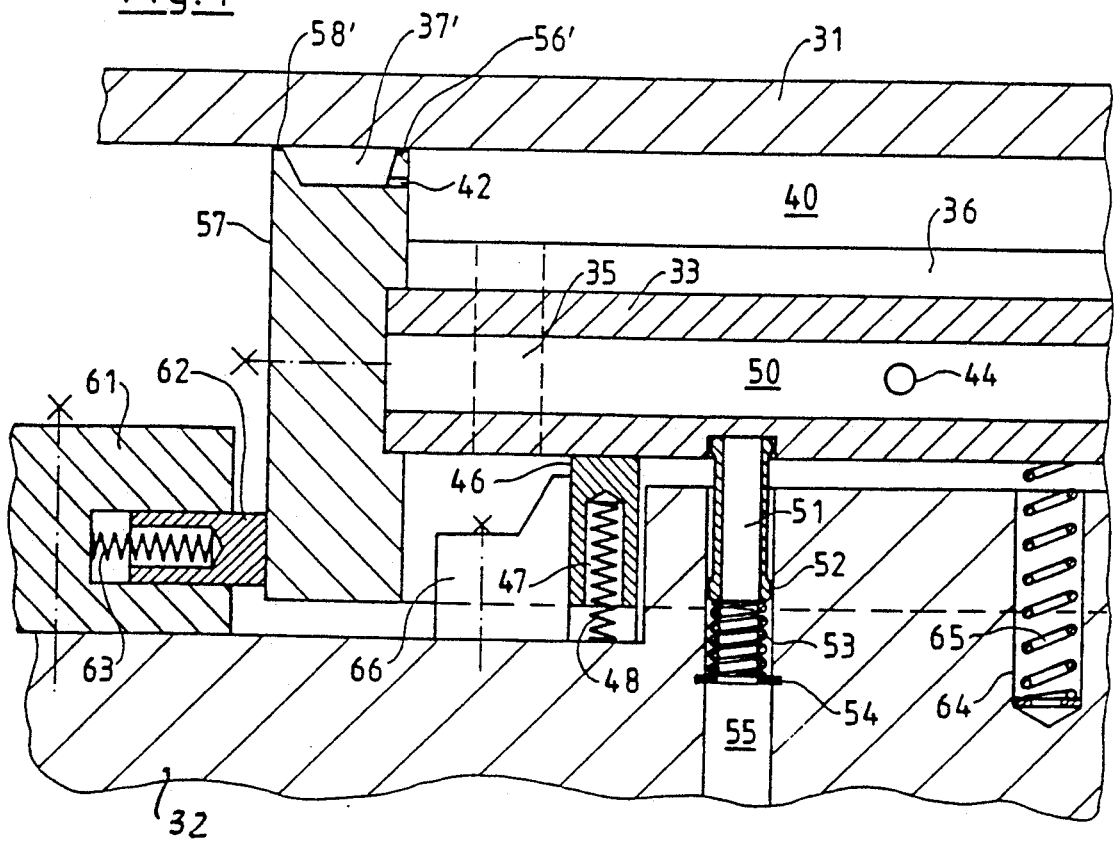

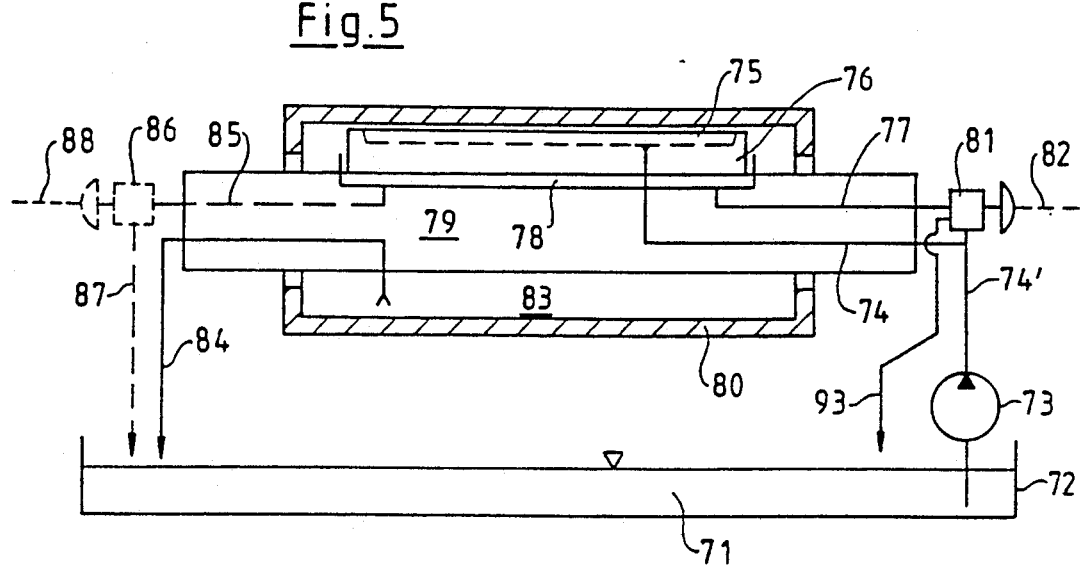

FLEXURE-COMPENSATED ROLL

BACKGROUND OF THE INVENTION

The present invention relates to the design of and the control of a pressing roll including hydrostatic pockets in which the rotary pressing casing of the roll is supported hydrostatically on an internal, non-rotary, longitudinal support.

The hydrostatic pocket containing pistons which are employed in these rolls are either round or elongate, as seen in a radial plan view.

Round pistons suffer from the disadvantage that under certain conditions, e.g. of breadth of the lands around the pockets and the gap width between the shoe and the roll casing, they involve a larger hydraulic periphery and hence a greater flow of hydraulic fluid and they furthermore require a greater driving power, using larger land areas.

For economy of operation, only longitudinally extending hydraulic pistons are acceptable, with shaped pressing shoes connected with the pistons. The shoes are either constituted by the pistons or are carried by them. For instance, there may be one, two, three or more such shoes distributed over the longitudinal length of the roll.

In German patent publication 2,502,161 Al, such a pressing shoe comprises a radially movable piston which is supported movably on the longitudinal support and is connected by a rocking joint with a saddle which is disposed radially outward of the piston and is adapted to the inner radius of the roll casing. The saddle contains hydrostatic pockets.

A broader and longer circumferentially middle pocket formed in the saddle is supplied with hydraulic fluid from the hydraulic pressure space underneath the piston and via holes through the rocking joint. The circumferentially external or flanking hydrostatic pockets are subdivided along the length of the saddle and receive hydraulic pressure fluid, i.e. oil, from the middle pocket via connecting holes between the middle and the external pockets, and that oil is drained off via external longitudinal lands into the essentially pressure free inner space of the roll.

Although a roll of this type has the advantage of a somewhat lower power dissipation for a given gap width and a given land breadth, it involves a relatively large gap height in order to prevent grating of the inner longitudinal lands on the roll casing caused by flexure of the saddle about the axis of rocking in the case of major supporting forces. However the consumption of hydraulic fluid increases with the cube of the gap width so that, for instance, in the case of a minimum gap width of 0.04 mm, a widening of the gap at the outer longitudinal lands by 0.02 mm will increase the fluid flow and hence the necessary pump power by a factor of i.e. 3.375.

A further disadvantage of the known system is that the rate at which oil is pumped into the hydrostatic pockets is proportional to the linear force of the pressing rolls and is inversely proportional to the viscosity of the oil. This means that the gap width between the lands of the saddle and the roll casing remains approximately constant independent of the linear force and the oil flow rate effective for the cooling of the roll, i.e. the removal of frictional heat generated during rotation of the casing by the lands, decreases at a low linear force and causes undesired, high temperatures, which, starting with the friction on the lands, leads to a temperature gradient in an inward direction and consequently to a heat induced bending of the saddle in the same direction as is caused by the flexure owing to supporting a force on the rocking joint. Therefore, during operation under either full load or even under partial load, with a low linear force, there will be widening of the gap along the outer lands which causes the above noted undesired effect for the required pump power.

The lower the temperature of the supplied hydraulic fluid or oil is, the greater is the heat induced curvature of the saddle, because the inner surface of the saddle is more strongly cooled. Owing to higher viscosity of the hydraulic fluid at a lower temperature, less hydraulic fluid will pass through the capillaries leading to all of the hydrostatic pockets. For this reason, there is less hydraulic fluid available for removal of the frictional heat which is produced in the gap between the saddle and the roll casing. The supply of cooler oil and the uneven thermal expansion cause the saddle to bend even more, and in an extreme case, the saddle may even grate against the inner lands on the roll casing, if counteraction is not taken by increasing the rate of flow of the hydraulic fluid.

SUMMARY OF THE INVENTION

One object of the invention is to prevent the above described negative effects and any fouling of the saddle on the inside of the roll casing in the cases of both high and low pressure forces. This is also to be possible with saddles having a large breadth as measured in the circumferential direction. In this case, heat induced bending increases approximately with the square of the breadth and mechanical bending even increases with the cube of the breadth.

A further object of the invention is to precisely and economically design, without excessive complexity or expense, the supply of hydraulic fluid and the setting of the supporting force.

This object is attained by bypassing the pressure fluid supply to the hydrostatic pockets so that it bypasses the pressure space under the piston and so that the pressure in the pressure space is regulated while the pressure to the hydrostatic pockets is not regulated.

The first above noted feature ensures that under partial loads with a low linear force on the roll, there will be no increased heating from coaction between the roll casing and the saddle, and thus that there will be no heat induced bending of the saddle.

The second above noted feature permits accurate pressure regulation because at all linear forces, only part of the flow goes through the regulation valve. Accordingly, the pressure loss in the regulation duct will be small and the regulation of the pressure will be precise, that is, it is minimally dependent on the changes in flow rate and in the viscosity of the hydraulic fluid.

In a further feature of the invention, the hydraulically effective surface of the saddle, which is the center portion between the one outer land and the other outer land, or of the pressure shoe is made larger than the piston area. This ensures that the mean pressure in the lateral hydrostatic pockets is less than in the middle chamber and that regulation by setting of the desired middle chamber pressure may be performed by supply of the hydraulic fluid. Therefore, the further hydraulic fluid necessary for regulating pressure and passing through the pressure regulating valve flows into the sealing gap on the saddle or shoe in addition to the hydraulic fluid passing through the capillaries and more particularly this also aids in preventing heating of the saddle.

However, pressure regulation is also possible by supplying the entire quantity of hydraulic fluid into the hydrostatic pockets including the middle chamber and by controlling removal of part of the flow from the middle chamber via a regulating valve which is designed to function as a pressure limiting means. Given a suitable geometry of the saddle, it is possible for the abstracted flow to be kept relatively low. The size of the hydraulically effective pressing area in relation to the roll casing is in this case selectable within wide limits. It may, for instance, be of larger or smaller area than the piston area or be of equal size.

In conjunction with the features described above, it is possible for the piston of the pressing shoe to also be fitted with springs, which would thrust it, possibly even against the force of gravity, against the moving roll casing without any danger of this action fouling the casing as long as there is a supply of hydraulic fluid.

For engaging the shoe or saddle against the roll casing, it is possible to control pressure in the pressure space below the piston or in the middle chamber by a pressure regulating valve into the pressure space or one out of the middle chamber. Engagement of the saddle against the roll casing is in this case ensured by subjecting the part of the area of the piston which is connected with the pressure regulating valve to a pressure which is sufficiently high to overbalance the weight of the pressing shoe and the frictional forces of the piston seal.

In this case, the rate of flow of the hydraulic fluid and the orifices of the chokes between this part of the area and the rest thereof are to be so limited that at a given minimum pressure set at the regulating valve, the desired pressing force is produced at the piston.

Because the longitudinal support or yoke and the piston supported thereon move in relation to each other, an adaptable duct connection is necessary for the supply of the hydraulic fluid to the capillaries. In lieu of using hose, for which much space is necessary and due to the resisting weakening of the longitudinal support, it is advantageous to provide connection sleeves between two approximately aligned radial holes in close limits with seals, which allow spherical adjustability or tilting in any direction, located at both ends, through which the hydraulic fluid is pumped to the hydrostatic pockets. The axial movability in the radial direction of the roll of these ports in the two holes is so dimensioned that the full height of the stroke, which is possible between the longitudinal support and the shoe, is taken up or allowed for, while in the case of a maximum stroke, it is impossible for the sealing rings to slip out of the hole. It is preferred for these movable ports to be positioned at one end or at both ends of the piston, if only one piston is present extending over the breadth, because here the bending of the longitudinal support is at a minimum and for this reason the necessary stroke is at a minimum.

It is particularly advantageous to divide the two pressure spaces in such a manner that one pressure space is provided in the "frame shape" at the periphery of the piston, which is connected with the middle chamber, and a second pressure chamber, which acts on the middle part of the piston, is created. This makes it possible for the middle pressure space to be made in one piece and of sufficient size and so that it is able to be sealed off.

There is then a simple "choke" seal by the design of the piston with a cross section generally in the form of a letter "U" whose legs project into two grooves in the longitudinal support. The sealing function between the piston and the longitudinal support may be provided for externally on the legs of the U, while choke gaps are provided to the inside of the legs. When there is an increase in the linear forces then owing to the bending of the longitudinal support, there will be such a large displacement between the support and the roll casing, on which the saddle rests, that the choke gaps will alter tending to give a smaller choke resistance. Finally, their function will be taken over by larger openings between the two pressure spaces, for instance, in the middle of the roll or close to the middle. This does not have any effect for the accuracy of regulation of the roll, because such alteration of the choke resistance takes place approximately linearly, at least in the case of small linear forces and may be taken into account in the increase of the linear regulation function between the external forces and the internal pressure of the roll, in the form of a correction of the increase of such straight line regulation functions.

In order to further ensure the piston middle pressure space at the ends of the piston, i.e. the end surfaces, as well, two sealing slides are provided adjacent to the two ends of the piston in transverse grooves in the longitudinal support. These slides fit into the intermediate space between the legs of the U shaped piston and are thrust by springs against the piston.

There are then connection ducts between the laterally outer piston pressure spaces and the middle chamber, preferably at the end outside clear of such sealing slide at the ends of the piston.

In a possible further development, a pressure regulation valve is provided. When it is set to zero, pressure opens both of the pressure supply ducts leading into the middle chamber and also the ducts leading to the hydrostatic pockets for draining oil back to the tank therefrom so that during unloading, it is possible for there to be a rapid decrease in pressure.

The same valve may in this case have a first sealing edge for regulating pressure during normal operation and a second sealing edge for relieving pressure when there is a zero linear force. Both of the sealing edges may in this respect be arranged on an axially moving spool, which is moved by the force of a spring in the "unloading" direction and by a fluid force source, for instance with a pressure space delimited to a variable extent by a pneumatically actuated rolling membrane and a thrust member in the "loading" direction.

Other objects and features of the invention are now described with reference to the accompanying drawings.

BRIEF DESCRIPTION OF THE DRAWINGS

FIG. 3 is part of the cross section taken through a fragment of a modified form of the roll wherein the piston and the saddle constitute a single unit.

FIG. 4 is a longitudinal section taken on the section line IV—IV of FIG. 3.

FIG. 5 is a diagram of the hydraulic fluid circuitry through a roll according to the invention.

FIG. 6 shows a regulation valve used with the roll, shown in the cross section.

DESCRIPTION OF THE PREFERRED EMBODIMENTS

Figure 1:
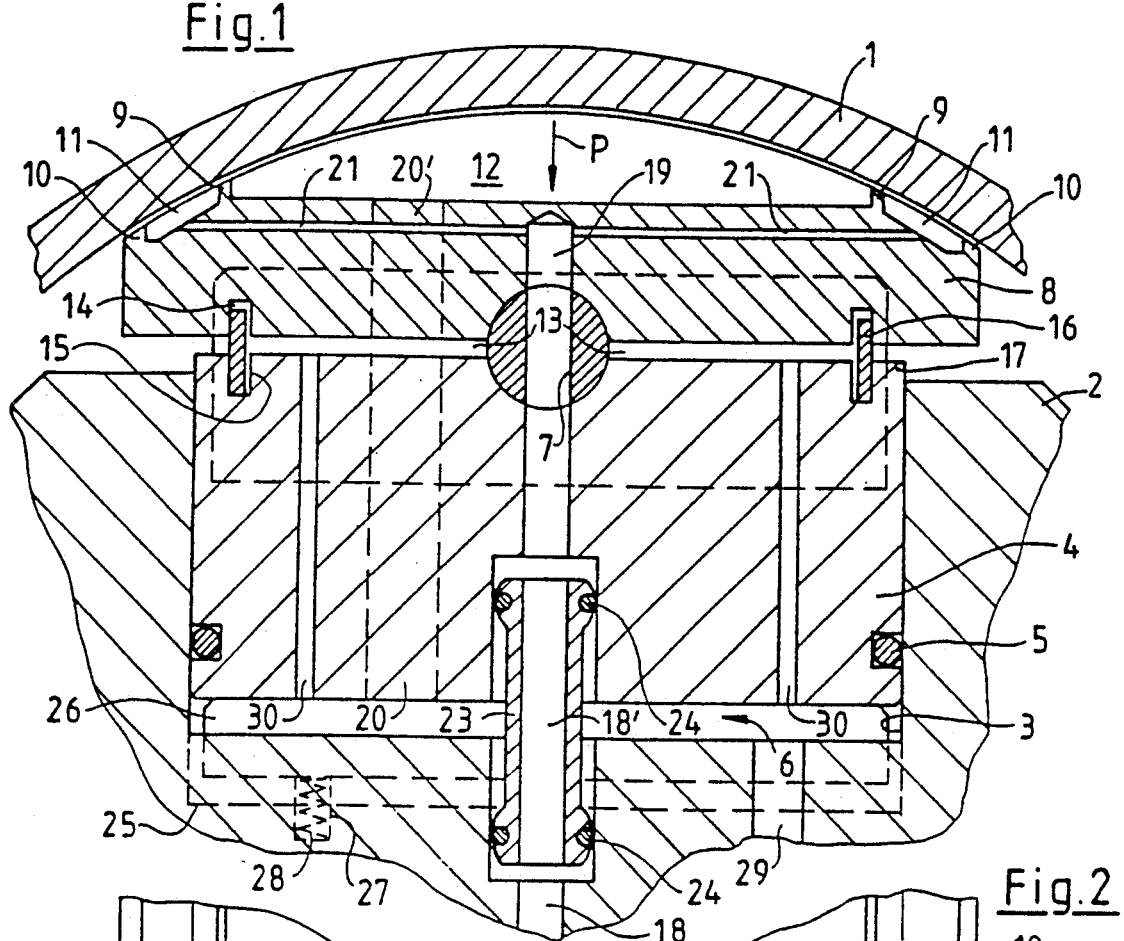
FIG. 1 is a cross sectional view of the fragment of a roll with a saddle mounted rockingly on a piston according to the invention.

In FIG. 1, a stationary longitudinal support or yoke 2 is arranged in an annular roll shell or roll casing 1. That casing is supported at its ends by bearings now shown to rotate. A radially moving piston 4 is embedded in a correspondingly shaped recess formed in the support 2. The piston has seals 5 on its periphery which make sealing contact with the inner wall surfaces 3 of the yoke 2. A pressure space 6 in the recess beneath the piston is supplied with hydraulic fluid via a line 29.

A circular pivot pin 7 is secured to the radial outside of the piston 4. It has a through hole 19 across it. The pin 7 rockingly carries a saddle 8 radially outside of it. The bottom or radial underside of the saddle has a groove adapted in shape to the top of the pin 7 so that the saddle may pivot or swivel around the pin and with reference to the piston. The radial exterior of the saddle 8 is curvedly adapted to the internal diameter of the casing 1. The saddle 8 furthermore has a circumferentially middle, large size pressure space 12, which extends essentially along the full axial length of the saddle. The saddle also has a plurality of pressure pockets 11 distributed along its length at both circumferential sides of and therefore laterally outward of the space 12. Axially adjacent pockets 11 at each side are separated from each other by transverse lands 22. The pockets are circumferentially externally delimited by outer lands 10. The pockets are also separated from the middle pressure space or chamber 12 by lands 9.

The radially intermediate space 13 between the piston 4 and the saddle 8 is connected by bores 30 with the pressure space 6 below the piston. The intermediate pressure space 13 is externally sealed off by bars 16 which run in grooves 14 and 15 in the saddle 8 and the piston 4, respectively, at the opposite ends of the space 13. The end seal with respect to the space 13 is by means of end seals 17 which are engaged by the bars 16.

Hydraulic fluid is directly supplied from a volumetric pump through ducts 18, 18, and 19 and further through choke means, e.g. in the form of capillaries, like 21, to the pockets 11. The connection from the duct 18 in the support 2 to the duct 19 through the piston 4 is by the intermediary of a sliding intermediate sleeve 23 which joins those two elements across the pressure space 6 and which is settable at a small tilt angle, through its sealing rings 24 resting in respective bores in the piston 4 and the yoke 2. A sealing slide 26 runs in a respective transverse groove 25 in the yoke 2.

Figure 2:
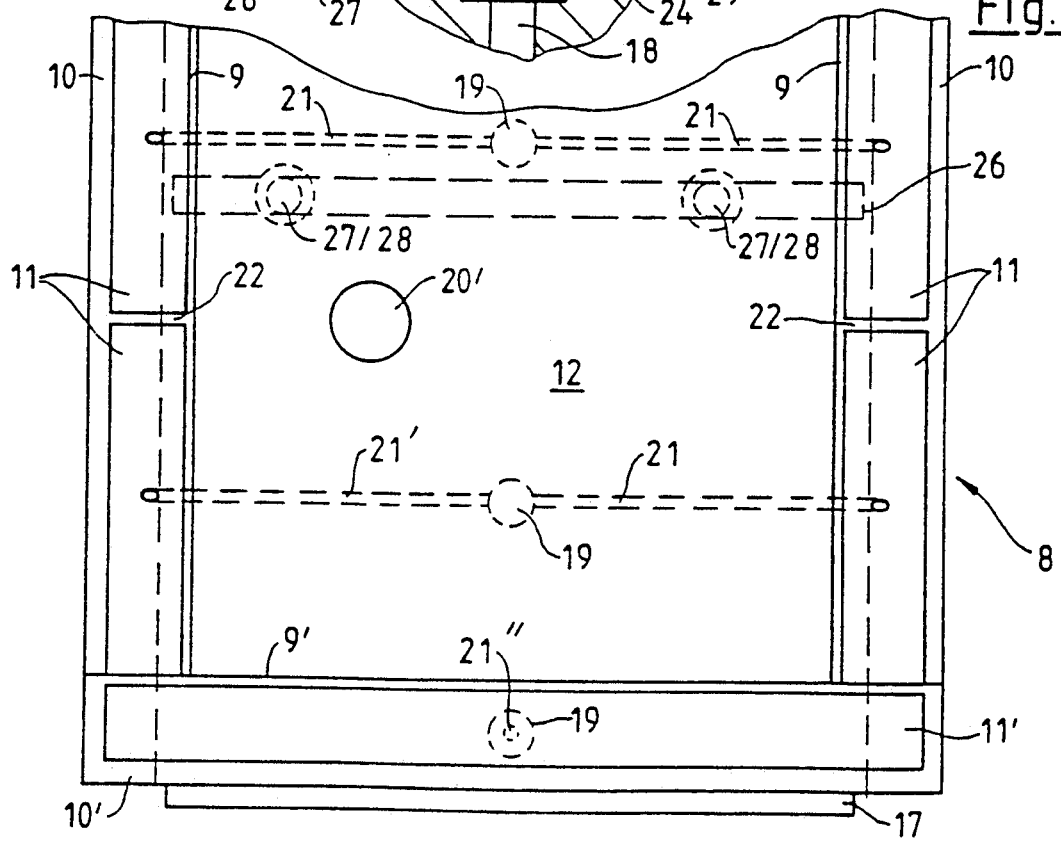
FIG. 2 is a radial plan view looking in the direction of the arrow P of FIG. 1 showing the saddle.

FIG. 2 shows a plan view of one end of the saddle 8 viewed in the direction P. The middle chamber 12 is supplied via a duct 20 through the piston 4 and 20' through the saddle 8 with hydraulic fluid from the piston pressure space 6. An axial end hydrostatic pocket 11' is delimited by spaced apart lands 10' and 9'. The supply of hydraulic fluid to the pocket 11' is via holes 19 and capillaries 21, 21' and, respectively, 21" leading into the pockets 11 and, respectively, 11'. Note that pathways of fluid supply to the chamber 12 and to the pockets 11, 11' are independent and not connected.

One of the end seals 17 is seen. One of the sealing slides 26 is seen. It is urged by springs 28 against the lower side of the piston 4. The springs 28 are arranged in blind holes 27 in the support 2.

FIG. 3 shows a rotatable roll casing 31 which rotates around a stationary longitudinal support 32 extending along and inside the casing 31. There is a radially movable, rockable piston 33 supported in a recess or groove formed in and extending along the longitudinal support 32. A pressure space 45 in the recess below the piston is sealed off from the outside by peripheral seals 34 at the support 32.

Sealing bars 36 are fixed on the piston 33 by screws 44. A plurality of radially outwardly opening hydrostatic pockets 37 are machined into the sealing bars 36 and are arrayed in a respective row along the length of each of the bars 36. The pockets 37 are delimited by inner and outer lands 56 and 58. Between the sealing bars 36 and the piston 33 there are thermally insulating plates 38 which may also function as sealing means.

Circumferentially between the sealing bars 36 there is a middle chamber or pressure space 40, which via holes 35, is connected with the pressure space 45 below the piston 33 and thereafter to the pressure space 45' (see FIG. 3) which is circumferentially outward of both sides of the pressure space 45. The space 45 under the piston 33 is supplied with hydraulic pressure fluid via a duct 41. Choke openings 39 in the pressure space 45 provide an initially high pressure difference in relation to pressure space 45'. During starting up, the pressure in the space 45 lifts the piston 33 against the force of gravity as soon as a sufficient quantity of pressure fluid is supplied via the duct 41. Later when fluid passes into space 45' under pressure, the piston applies operating pressure.

The screws 44 have axial capillary holes 43 therethrough. The supply of the hydraulic fluid into the hydrostatic pockets 37 is via the separate line 55 and a movable and tiltable intermediate member 52 with a bore 51 which extends across the pressure space 45 and communicates into the axial distribution duct 50 of the piston 33 and then into choke means in the form of branch bores 49 leading to the pockets 37. The intermediate member 52 is urged up by a spring 53 to seat against the piston 33. The spring 53 bears in the yoke 32 against a spring washer 54.

In FIG. 4, an axial end sealing bar 57 is secured to the piston 33, for instance, by being screwed to it. The end bar includes an outer pocket 37', which is supplied with hydraulic fluid via a capillary hole 42 in the end bar. An end sealing bar 62 is mounted in an axially movable manner in a sealing bar holder 61. The holder 61 is fixedly mounted, for instance by screws, on the longitudinal support 32. The bar 62 is urged by springs 63 against the end sealing bar 57. A sealing slide 46 is guided for radial movement in a groove defined by the longitudinal support 32 on the one hand and on the other hand by a block 66 which is permanently connected to the support 32, for instance by screws. A spring 48 is provided in a hole 47 in the sealing slide 46 and urges the sealing slide 46 against the piston 33. Further holes 64 provided in the longitudinal support 32 may, if required, have a spring 65, which urges the piston 33 against the casing 31. If the springs 65 are sufficiently strong, it is possible to do without any choke gaps 39 for causing initial engagement of the sealing bars 36 on the roll casing 31, and the illustrated narrow gaps 39 may then be made wide. It would also be possible to dispense with sealing slides 46. There need only then be a single pressure space 45.

FIG. 5 explains in a diagrammatically simplified manner the path that is followed by hydraulic fluid from its source to the outer hydrostatic pockets, the middle chamber and the piston pressure space. The path of the hydraulic fluid to the hydrostatic pockets 75 in FIG. 5, and to pockets 11 in FIG. 1 and pockets 37 in FIG. 3 is directly via the duct 74, which is also seen in FIG. 6. For this, hydraulic fluid 71 is pumped by the pump 73 from the tank 72 to the line 74', seen also in FIG. 6. Another part of the flow of fluid passes through the regulation valve 81 detailed in FIG. 6 to the piston pressure space 78 in FIG. 5, 6 in FIG. 1 or 45 in FIG. 3 via the line 77 and then the line 28 (FIG. 1) or the lines 41 and 35 (FIGS. 3 and 4) and finally into the middle chamber via the lines 20 and 20' (FIG. 1) or the line 35 (FIGS. 3 and 4). The pressure is set by the regulation valve 81 via the control line 82. The control line receives a control pressure that is dependent upon the desired pressure in the piston pressure space. A leakage drain oil line or relief line 93 runs from the valve 81 back to the tank 71. The hydraulic fluid coming from the hydrostatic pockets 75 in FIG. 5, 11 in FIG. 1, or 37 in FIG. 3 into the inside 83 of the roll 80 flows through the line 84 back to the tank 72.

As an alternative to the regulation valve 81 and the control line 82 and furthermore to the line 77, the regulation may be performed in such a manner that the hydraulic fluid from the piston pressure space 78 flows via a drain line 85 to a pressure limiting valve 86 and through this pressure limiting valve via the line 87 back to the tank 72. A desired pressure is then set in the pressure space 78 via the control line 88. The pressure limiting valve 86 opens as soon as the pressure in the pressure space 78 exceeds the set rated value and closes when the pressure goes below the rated value.

It is conventional and expedient for the effective hydraulic area of the middle chamber 12 and 40 of FIGS. 1 and 3, respectively, to be smaller than the effective pressure area of the respective piston 4 and 33 beneath the pressure area.

Furthermore, the space 13 between the piston 4 and the saddle 8 naturally has a smaller hydraulic effective pressure area than the piston pressure area. In FIG. 3 the outer parts 33' of the piston 33 frame the underside of the piston main body 33 and the pressure space 45.

FIG. 6 shows a valve housing 90 with a regulation piston 94 and a longitudinal support 79 which corresponds to 2 in FIG. 1 or 32 in FIG. 3, having the two pressure fluid lines 74 and 77, which deliver fluid out of the valve housing 90. The line from the pump 73 is connected to the inlet end of the duct 74'. The quantity of hydraulic fluid flowing through the throttling or regulation gap 90 into the line 77 is sufficient to maintain the selected pressure in the pressure space 78. The line 74 to the hydrostatic pockets at 75, in contrast, is directly connected to the inlet line 74' without passing through the regulating valve.

The spool 94 extends into the valve housing 90 and into the upper part of the housing 91. The housing part 91 is shut off by a cap 92, which has a connection 82 for receiving operating air. A leakage oil line 93 runs back to the tank 72. The spool 94 is urged by a spring 95 to the right, which is the direction of pressure reduction in the pressure space 78. The spool 94 is urged by a rolling membrane 97, which bears against a thrust member 106 of the control spool 94, to the right, which is the direction of pressure increase in the pressure space 78, as soon as hydraulic or pneumatic pressure is applied to the opening 82'. In the left hand extreme unloaded, open position of the spool 94, the regulation gap 98 is wide open.

When the valve spool 94 is moved out of the "unloaded" open or left end position toward the "loaded" or right position, it performs functions in sequence. First switching collar 105 shuts off a valve orifice between the pressure oil supply line 74', with which the hydrostatic pocket supply capillaries 21 and 43 are directly connected, and a pressureless outlet 93. Then a second switching collar 104 closes the valve opening, which connects the supply line 74' and the piston main pressure chamber 12 or 40. Only when the second switching collar 104 of the spool has run through the second valve opening, then sealing edge regulating piston pressure becomes active on the rear side of the sealing edge.

When the valve cross section is excessively reduced by choking, the pressing force of the saddle decreases and fluid control pressure leads to wider opening of the valve orifice.

A drop in the pressing thrust when the valve opening is shut, that is to say with an uninterrupted flow to the middle chamber, is unavoidable if the effective area of the piston is smaller than that of the pockets, including the middle chamber. For this reason, it is necessary for the pressure in the middle chamber to always be greater than that pressure in the hydrostatic pockets so that there is a flow of hydraulic fluid from the middle chamber into the hydrostatic pockets.

On a decrease in the pressure in the control line 82, the valve spool 94 moves to the right. This sequentially produces connections between the lines 74 and 74' and 93. In its extreme right position, it also produces a connection between the lines 74 and 77 and, consequently, between the lines 77 and 93. Furthermore, at the left end of the valve spool 94, there is a damping chamber 99 with a choke 100 leading to the line 77. A sealing ring 96 may be inserted in order to prevent the escape of oil into the housing 91. A pressure equalizing hole 101 connects the interior of the housing 91 with the atmosphere. This hole 101 may furthermore be selectively made in the tank line 93.

The rolling membrane 97 is gripped between the upper part of the housing 91 and the cover 92, where the edge of the membrane functions as a seal.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A flexure compensating roll comprising:
   a rotatable external roll casing having a rotation axis;
   a longitudinal support extending axially through the roll casing and facing toward the side of the roll casing to which pressure is applied and spaced away from that side of the roll casing;
   an elongate piston supported on and extending along the longitudinal axis of the support defining a pressure space in the support beneath the piston, which space is pressurizable for moving the piston out of the support and toward the interior of the casing;
   sealing means between the piston and the support for the pressure space
   a shoe supported on the piston for being moved by the piston out of and back toward the longitudinal support, the shoe having a side facing to the interior of the roll casing and being adapted externally to the internal diameter of the roll casing; the shoe having a circumferentially middle pressure chamber therein and also having a respective row of hydrostatic pockets arranged alongside the middle chamber at opposite circumferential sides of the middle chamber, and the middle chamber and the hydrostatic pockets facing out of the shoe surface and toward the interior, of the casing;

a pressure fluid connection between the pressure space beneath the piston and the middle pressure chamber of the shoe such that pressurizing of the pressure space delivers pressure fluid to the middle chamber;

unregulated pressure fluid connections to the hydrostatic pockets, and the connections to the hydrostatic pockets including choke elements which limit the quantity of pressure fluid to the pockets, the connection to the pockets bypassing both the pressure space and the middle chamber;

a regulation device for controlling the pressure force applied on the roll casing by regulating the pressure in the middle chamber and the regulation device not being connected with the pockets.

2. The roll of claim 1, wherein the longitudinal support has a groove which receives the piston and the piston has a bottom part that is received in the groove in the support and the pressure space being defined beneath the piston bottom part in the groove in the support;

the piston further comprising a saddle which is on the side of the piston toward the interior of the casing; the middle chamber and the hydrostatic pockets being formed on the side of the saddle toward the interior of the casing;

a swivel joint between the saddle and the bottom part of the piston enabling the bottom part of the piston to swivel around the swivel joint which is swiveling around an axis parallel to the longitudinal axis of the roll.

3. The roll of claim 2, further comprising springs for pressing the saddle toward the interior of the casing.

4. The roll of claim 2, further comprising a connecting sleeve extending between the longitudinal support and the piston and moveable both axially and radially relevant to the piston, the sleeve having a central pressure fluid duct therethrough, the sleeve being supplied with pressure fluid through the longitudinal support for supplying the pressure fluid into the piston; and means connecting from the sleeve to the hydrostatic pockets for delivering pressure fluid thereto.

5. The roll of claim 4, wherein the means for delivering pressure fluid from the sleeve comprises fluid flow control chokes communicating to the hydrostatic pockets.

6. The roll of claim 2, further comprising a duct from the longitudinal support into the piston for delivering pressure fluid from the longitudinal support into the piston and further comprising fixed cross-section chokes for delivering restricted amount of pressure fluid from the duct to each of the hydrostatic pockets.

7. The roll of claim 2, wherein the middle chamber has an effective hydraulic pressure area circumferentially around the casing, and the piston in the pressure space has an area; the effective pressure area of the middle chamber is smaller than the effective pressure area of the piston in he pressure space.

8. The roll of claim 2, wherein the saddle has a surface toward the casing which is the shoe thereof and the shoe has a pressing area with a circumferential length of the shoe is larger than the hydraulically effective area of the piston below the saddle.

9. The roll of claim 8, further comprising means for supplying a variable supply of pressure fluid to the middle chamber for regulating the pressing force of the shoe.

10. The roll of claim 9, wherein the means for supplying fluid comprising a regulation valve for regulating the supply of fluid to the middle chamber.

11. The roll of claim 10, wherein the regulation valve comprises a pressure limiting valve for controlling the outward flow of pressure fluid from the middle chamber.

12. The roll of claim 10, wherein the pressure regulation valve comprises a valve for controlling the supply of pressure to the pressure space in the support beneath the piston.

13. The roll of claim 10, further comprising springs for pressing the saddle toward the interior of the casing.

14. The roll of claim 10, wherein the pressure regulation valve communicates between a supply of pressure fluid and the middle chamber of the piston, the valve includes a first valve orifice with a control collar moveable with respect to the first orifice to open and close it, such that elevated pressure from the pressure supply opens the control collar to enable delivery of pressure fluid to the middle chamber;

when the pressure of the supply of pressure fluid is relieved, the valve including a second valve orifice and a second control collar which connects the supply of hydraulic fluid which was to the middle chamber with a pressure free drain.

15. The roll of claim 14, wherein the valve comprises a single valve spool and the first and the second control collars being disposed on the valve spool to be moved together with the valve spool;

a spring acting on the valve spool to normally move it in the unload direction, which connects the supply of pressure fluid to the drain; and a fluid operated source of force acting on the spool to move it in the opposite load direction for causing the first valve orifice to deliver pressure fluid to the middle chamber.

16. The roll of claim 15, wherein the fluid operated source of force comprises a radially symmetric rolling membrane which at one side sealingly creates a pressurizable space and at the other side communicates with the valve spool against which the membrane rests; a pressure line connected with the pressurizable space at one side of the membrane for pressurizing the pressurizable space and shifting the membrane to move the spool in the load direction against the spring force.

17. The roll of claim 8, wherein the middle chamber has an effective hydraulic pressure area circumferentially around the casing, and the piston in the pressure space has an area; the effective pressure area of the middle chamber is smaller than the effective pressure area of the piston in the pressure space.

18. The roll of claim 1, wherein the piston has a surface toward the casing which is the shoe of the piston and the shoe has a pressing area with a circumferential length around the roll casing, and the circumferential length of the shoe is larger than the hydraulically effective area of the piston below the saddle;

means for supplying a variable supply of fluid to the middle chamber for regulating the pressing force of the shoe.

19. A flexure compensating roll comprising:

a rotatable external roll casing having a rotation axis;

a longitudinal support extending axially through the roll casing and facing toward the side of the roll casing to which pressure is applied and spaced away from that side of the roll casing;

an elongate piston supported on and extending along the longitudinal axis of the support defining a pressure space in the support beneath the piston, which space is pressurizable for moving the piston out of the support and toward the interior of the casing; sealing means between the piston and the support for the pressure space; the longitudinal support having a groove which receives the piston and the piston having a bottom part that is received in the groove in the support and the pressure space being defined beneath the piston bottom part in the groove in the support;

a shoe supported on the piston for being moved by the piston out of and back toward the longitudinal support, the shoe having a side facing to the interior of the roll casing and being adapted externally to the internal diameter of the roll casing; the shoe having a circumferentially middle pressure chamber therein and also having a respective row of hydrostatic pockets arranged alongside the middle chamber at opposite circumferential sides of the middle chamber, and the middle chamber and the hydrostatic pockets facing out of the shoe surface and toward the interior of the casing;

a saddle on the side of the piston toward the interior of the casing; the middle chamber and the hydrostatic pockets being formed on the side of the saddle toward the interior of the casing;

a swivel joint between the saddle and the bottom part of the piston enabling the bottom part of the piston to swivel around the swivel joint which is swiveling around an axis parallel to the longitudinal axis of the roll;

a duct extending through the piston from the pressure space in the longitudinal support to the top of the piston between the piston and the saddle;

a pressure fluid connection between the pressure space beneath the piston and the middle pressure chamber of the shoe such that pressurizing of the pressure space delivers pressure fluid to the middle chamber;

further pressure fluid connections to the hydrostatic pockets, and the connections to the hydrostatic pockets including choke elements which limit the quantity of pressure fluid to the pockets, the connection to the pockets bypassing both the pressure space and the middle chamber; and a regulation device for controlling the pressure force applied on the roll casing by regulating the pressure in the middle chamber and the regulation device not being connected with the pockets.

20. A flexure compensating roll comprising:

a rotatable external roll casing having a rotation axis;

a longitudinal support extending axially through the roll casing and facing toward the side of the roll casing to which pressure is applied and spaced away from that side of the roll casing;

an elongate piston supported on and extending along the longitudinal axis of the support defining a pressure space in the support beneath the piston, which space is pressurizable for moving the piston out of the support and toward the interior of the casing; sealing means between the piston and the support for the pressure space, the longitudinal support having a groove which receives the piston and the piston having a bottom part that is received in the groove in the support and the pressure space being defined beneath the piston bottom part in the groove in the support;

a saddle supported on the piston for being moved by the piston out of and back toward the longitudinal support, the saddle having a surface toward the casing which is a shoe and having a side facing to the interior of the roll casing and being adapted externally to the internal diameter of the roll casing; the shoe having a circumferentially middle pressure chamber therein and also having a respective row of hydrostatic pockets arranged alongside the middle chamber at opposite circumferential sides of the middle chamber, and the middle chamber and the hydrostatic pockets facing out of the shoe surface and toward the interior of the casing; the shoe having a pressing area with a circumferential length around the roll casing, and the circumferential length of the shoe being larger than the hydraulically effective area of the piston below the saddle;

a swivel joint between the saddle and the bottom part of the piston enabling the bottom part of the piston to swivel around the swivel joint which is swiveling around an axis parallel to the longitudinal axis of the roll;

means for supplying a variable supply of pressure fluid to the middle chamber for regulating the pressing force of the shoe;

a pressure fluid connection between the pressure space beneath the piston and the middle pressure chamber of the shoe such that pressurizing of the pressure space delivers pressure fluid to the middle chamber;

further pressure fluid connections to the hydrostatic pockets, and the connections to the hydrostatic pockets including choke elements which limit the quantity of pressure fluid to the pockets, the connection to the pockets bypassing both the pressure space and the middle chamber;

a regulation device for controlling the pressure force applied on the roll casing by regulating the pressure in the middle chamber and the regulation device not being connection with the pockets; and the piston pressure space within the longitudinal support being in first and second parts, a choke between the first and second parts of the pressure space restricting the flow rate between the parts of the pressure space, the first part of the pressure space being more toward the middle of the piston and the second part being outward of the first part; the first part of the pressure space being connected with the middle chamber and with the means for supplying pressure fluid to the middle chamber, whereby pressure supplied to the pressure space initially applies pressure to the first part of the piston.

21. The roll of claim 20, wherein the piston has edge ribs extending into the pressure space and the edge ribs surrounding and defining the first part of the pressure space; the first part of the pressure space is connected with the pressure regulation valve and with the middle chamber.

* * * * *